United States Patent Office 3,346,335
Patented Oct. 10, 1967

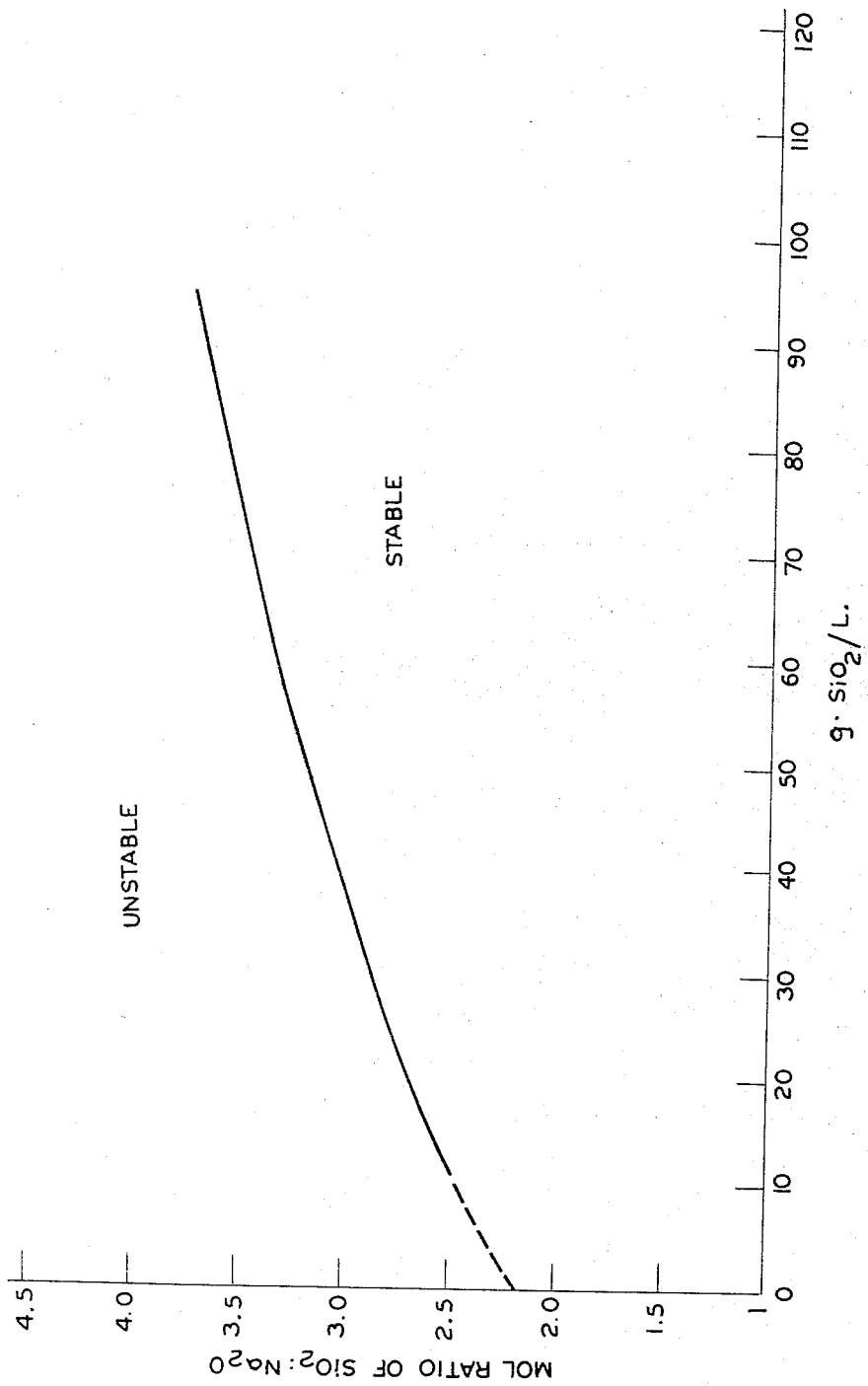

3,346,335
PROCESS FOR SILICA AND SILICATES
Roland Schnürch, Dusseldorf-Holthausen, Alfred Köster, Dusseldorf-Oberkassel, and Rudolf Heise, Dusseldorf-Holthausen, Germany, assignors to Philadelphia Quartz Company, Philadelphia, Pa., a corporation of Pennsylvania
Filed Mar. 8, 1965, Ser. No. 437,997
Claims priority, application Germany, Mar. 19, 1964, H 52,102
20 Claims. (Cl. 23—110)

This invention is directed to a process for the simultaneous preparation of finely divided silica and highly useful aqueous solutions of alkali metal silicates.

In the past, it has been the practice to prepare finely divided silica by the addition of electrolytes, especially acidic electrolytes, to aqueous soluble silicates. A dilute alkali salt solution remains and generally it is of no technical use.

It is therefore an object of this invention to provide a process for the preparation of finely divided silica from an alkali metal silicate solution which does not require the addition of electrolytes.

It is a further object of this invention to provide a process for the preparation of finely divided silica wherein the residual silicate solution contains lesser impurities and is of enhanced technical value.

A further object of this invention is to provide a process for the preparation of aqueous solutions of alkali metal silicates which are very pure and of great technical value.

The process of this invention by which can be prepared both finely divided silica and very pure alkali metal silicate solutions comprises heating under pressure an alkali metal silicate solution having a mole ratio of $SiO_2$ to alkali metal oxide of about 2.5:1 to about 4.5:1 at a maximum concentration, which increases with mole ratio, of below about 165 grams of $SiO_2$ per liter of solution, preferably between about 10 to 125 grams of $SiO_2$ per liter.

The solution should be heated to a temperature of at least about 100° C. for a time sufficient to cause precipitation of silica and thereby forming a suspension. Preferably, the solution is heated to a temperature of about 130° C. to about 200° C. Heating may be accomplished externally or by, for example, the introduction of superheated steam.

Somewhat greater than atmospheric pressure is generally employed in the process of this invention. Pressure can vary greatly but generally the pressure must be sufficient to avoid evaporation of the solution and thereby prevent the concentration of the starting solution from changing. The pressure attainable while heating the solution in a closed reactor vessel such as, for example, an autoclave is satisfactory. However, greater pressures may be utilized and the most satisfactory pressure is easily estimated by simple tests.

The process of this invention is conducted with an alkali metal silicate solution having a mole ratio of $SiO_2$ to alkali metal oxide in the range of about 2.5:1 to about 4.5:1 and preferably between about 3.0:1 and 4.2:1 and a maximum concentration of $SiO_2$ of below about 165 grams per liter. While the lower limit of concentration of the alkali metal silicate solution is approximately 10 grams of $SiO_2$ per liter, the process can be carried out with more dilute solutions but this is generally not advantageous for economic reasons.

As has already been stated, the maximum concentration at which the process may be carried out depends on the mole ratio $SiO_2:Me_2O$. The higher the mole ratio the higher the concentration may be but the upper limit lies below about 165 grams of $SiO_2$ per liter with a preferred range of concentration between about 10 and 125 grams of $SiO_2$ per liter.

If this maximum concentration of the soluble silicate solution is exceeded, there will be little or no separation of $SiO_2$. Thus at a mole ratio of $SiO_2:Na_2O$ of 3.9:1 and a concentration of 75 grams of $SiO_2$ per liter, silica will precipitate at a temperature of 150° C. However, under the same conditions, except that the mole ratio is 3:1, there will be no separation of silica. Even at 60 grams of $SiO_2$ per liter, no precipitation takes place, but on further dilution of the solution at the mole ratio of 3:1 to 20 grams of $SiO_2$ per liter, for instance, silica can be precipitated from the solution.

The drawing shows the maximum concentrations of sodium silicate solutions at different mole ratios from which silica will precipitate at a temperature of 150° C. for a period of 1.5 hours. Silica will precipitate in the area marked "unstable" above the equilibrium curve but, when concentrations in the region marked "stable" are reached, no more precipitation will occur.

It has also been found that the maximum permissible concentration depends to some degree on the type of alkali metal ion and the working temperature as well as on the mole ratio. This is especially true for sodium and potassium silicate solutions. It is necessary to heat the alkali metal silicate solutions under pressure to temperatures of at least about 100° C. and preferably between 130° and 200° C., or more especially between 140° and 160° C. in order to obtain reasonably fast precipitation. Maximum precipitation of finely divided silica is obtained by heating for a finite period of time which will depend upon the temperature as well as the composition of the alkali metal silicate solution, and generally is between about 10 minutes and 3 hours. Although a longer heating period may be used, it will not significantly increase the yield of finely divided silica as long as the reaction temperature is not too low.

The maximum concentrations to be used under different plant conditions are readily estimated by simple tests taking into account the fact that the maximum concentration increases with increasing mole ratio, as shown in the drawing, where the change is almost linear over a wide area.

Precipitated silica may be filtered out of the alkali metal silicate solution or separated by any other ordinary means. It may then be washed in the usual way with water or dilute acid and dried.

The residual alkali metal silicate solutions obtained after separation of the silica contain very little impurties compared to the prior art commercial alkali metal silicate solutions. They may be used to dissolve more solid alkali metal silicate thus preparing a fresh solution for further precipitation or, of course, for the other purposes for which such solutions are known.

In the case of the potassium silicate solutions especially, the residual alkali metal silicate solutions are found to form television screens of exceptionally good wet strength. It is well known that in the preparation of television screens alkali metal silicate solutions of specific mole ratios must be used. When the solution obtained by our procedure is at a lower alkali content it can be adjusted by the addition of a caustic alkali to the preferred range of $SiO_2:Me_2O$ of about 3.0:1 to about 4.0:1 for preparing television screens.

In the past, it has been necessary to treat alkali metal silicate solutions which are to be used for the preparation of television screens with certain metal salts such as, for example, alkaline earth metal salts, but the process of the present invention forms alkali metal silicate solutions so pure that further treatment is not needed.

Furthermore, the process can be varied so that either the silica or the alkali metal silicate solution is obtained as the primary end product.

Should finely divided amorphous silica be desired, it is advantageous to start with an alkali metal silicate solution having a high mole ratio of silica to alkali metal oxide and concentrations considerably below the maximum concentration at which the silica precipitation will take place.

On the other hand, if the alkali metal silicate solution is the desired product as, for instance, for the production of television screens, then it is advantageous to start with alkali metal silicate solutions having concentrations only slightly below the maximum concentration because in this case it is not usually necessary to precipitate large amounts of finely divided silica.

The starting solutions may be commercial alkali metal silicate solutions or solid alkali metal silicates, such as sodium or potassium silicates, dissolved in water, sodium hydroxide, potassium hydroxide, or alkali metal silicate solutions. In any case, the starting solution must have a mole ratio of silica to alkali metal oxide of at least about 2.5:1.

In some cases it may be preferred to carry out the process with the precipitation of the finely divided silica occurring in more than one step. For instance, a two-step process may be especially desirable. In such a multi-step process, the smaller part of the total precipitatable silica present should be precipitated in the first step. This can be done by working first with an alkali metal silicate solution at a concentration only slightly below the maximum concentration at which silica precipitation will begin. After the silicate has precipitated and has been separated the alkali silicate solution may then be diluted and additional silica precipitated. Such double or multiple step processes can be advantageous if a considerable amount of impurity is present in the starting solution and it is desirable to prevent a build-up of these in the precipitated silica.

On the other hand, the process may be practiced continuously. In such a continuous process it is best to pass the solution through a reactor vessel such as, for example, a tube heated from the outside. The rate of flow will depend on the temperature reached inside the tube. The reactor vessel should have an adjustable opening at the end to control the flow of the suspension of silica in the alkali silicate solution and retain the necessary pressure at the temperature of reaction. The suspension is collected under atmospheric pressure in an open kettle and the silica filtered from the solution.

EXAMPLES

The following examples are given for the purpose of illustrating the invention and include the best mode contemplated for carrying out the invention. These examples are not to be construed as limiting the invention which is defined in the claims.

*Example 1*

A sodium silicate solution with a mole ratio of $SiO_2:Na_2O$ of 3.89:1 and a silica content of 26.95 grams per liter was heated in an autoclave at 200° C. for 15 minutes. The solution contained a silica gel which easily settled and which was separated by filtration. The residue was washed several times with hot water, then with diluted hydrochloric acid, and finally again with hot water, dried at 110° C. and finally pulverized.

The residual mother liquor contained 17.02 grams of $SiO_2$ per liter and had a mole ratio of 2.50 which corresponds to a precipitation of about 37% of the original silica.

*Example 2*

A sodium silicate solution with a mole ratio of $SiO_2:Na_2O$ of 3.89:1 and a silica content of 101.4 grams per liter was heated in an autoclave at 150° C. for 1.5 hours after which the silica was separated and washed. About 7% silica, calculated on the amount originally present in the sodium silicate solution, was precipitated.

*Example 3*

A sodium silicate solution with a mole ratio of $SiO_2:Na_2O$ of 3.89:1 and a silica content of 59.90 grams per liter was heated as in Example 2. 18% of the total silica present was precipitated.

*Example 4*

On heating, as in Example 2, the sodium silicate solution with a mole ratio of $SiO_2:Na_2O$ of 3.89:1 and a silica content of 33.68 grams per liter, 33% of the total silica was precipitated. The precipitated silica was separated by filtration and the mother liquor, which had a mole ratio of $SiO_2:Na_2O$ of 2.75:1, was used to dissolve added solid sodium silicate.

*Example 5*

Treating a sodium silicate solution with a mole ratio of $SiO_2:Na_2O$ of 3.89:1 and a silica content of 20.21 grams per liter, as in Example 2, caused the precipitation of 38% of the total $SiO_2$ present.

*Example 6*

A sodium silicate solution with a mole ratio of $SiO_2:Na_2O$ of 3.45:1 and a silica content of 32.4 grams per liter was heated at 150° C. for 1.5 hours. About 20% of the total silica was precipitated.

*Example 7*

After heating to 150° C. for 0.5 hour a sodium silicate solution with a mole ratio of $SiO_2:Na_2O$ of 3.89:1 and a silica content of 26.95 grams per liter, a precipitation of 35% of the total silica was obtained.

*Example 8*

About 31% of the total silica was precipitated after 1.5 hours heating to 130° C. of the alkali metal silicate solution of Example 7.

*Example 9*

A potassium silicate solution with a mole ratio of $SiO_2:K_2O$ of 2.78:1 and a silica content of 20.25 grams per liter was heated at 150° C. for 1.5 hours. The precipitated silica was filtered off and dried. The precipitate consisted of 7% of the total silica present.

*Example 10*

A potassium silicate solution with a mole ratio of $SiO_2:K_2O$ of 3.48:1 and a silica content of 27.22 grams per liter was treated as described in Example 9. The precipitate consists of about 23% of the total silica. If the 1.5 hour heating of the potassium silicate solution is carried out at 170° C., a precipitate is obtained which constitutes about 25% of the total silica.

*Example 11*

A potassium silicate solution with a mole ratio of $SiO_2:K_2O$ of 4.06:1 and a silica content of 27.14 grams per liter was heated as described in Example 9. About 38% of the total silica was precipitated.

*Example 12*

A sodium silicate solution with a mole ratio of $SiO_2:Na_2O$ of 3.98:1 with a silica content of 22.60% and an $Fe_2O_3$ content of 0.0077% was diluted to a concentration of 20 grams $SiO_2$ per liter and heated for 1.5 hours at 150° C. More than 90% of the $Fe_2O_3$ was precipitated with the silica. The mole ratio of $SiO_2:Na_2O$ of the residual mother liquor was 2.46:1.

*Example 13*

A potassium silicate solution with a mole ratio of $SiO_2:K_2O$ of 4.18:1 and a silica content of 21.8% was diluted to 80.2 grams $SiO_2$ per liter and heated at 145° C. for 1.5 hours. The precipitated material was filtered off and the filtrate adjusted with very pure potassium hydroxide solution to a mole ratio of $SiO_2:K_2O$ of 3.46:1 and concentrated in vacuum to a silica concentration of 19.55%. A potassium silicate solution was obtained which contained 0.00051% $Fe_2O_3$, 0.0083% $Al_2O_3$ and 0.002% $TiO_2$. If the potassium silicate solution of the mole ratio of $SiO_2:K_2O$ of 4.18:1 is directly adjusted with pure potassium hydroxide and water to a mole ratio of $SiO_2:K_2O$ of 3.43:1 and 19.48% $SiO_2$ followed by filtration, a potassium silicate solution is obtained which contains 0.0069% $Fe_2O_3$, 0.056% $Al_2O_3$ and 0.006% $TiO_2$.

*Example 14*

A potassium silicate solution with a mole ratio of $SiO_2:K_2O$ of 3.47:1 and a silica content of 19.3% was diluted to 6.92% $SiO_2$ and heated to 150° C. for 1.5 hours. After filtration of the precipitate, a potassium silicate solution with a mole ratio of 3.41 was obtained containing 6.76% $SiO_2$ and 0.00051% $Fe_2O_3$. A solution containing 0.0018% $Fe_2O_3$ is obtained when the same starting solution is adjusted directly with pure potassium hydroxide solution and water to a mole ratio of 3.41 and a silica content of 6.76%.

*Example 15*

A potassium silicate solution with a mole ratio of $SiO_2:K_2O$ of 4.18:1 and a silica content of 21.75% was diluted with water to 80.2 grams per liter $SiO_2$ and heated to 145° C. for 1.5 hours in a rotating autoclave. The solution was filtered and the alkali metal silicate solution with a mole ratio of 3.83:1 was evaporated under vacuum. This concentrated solution then was adjusted with 50% potassium hydroxide solution to a commercial concentration of 19.55% silica and a mole ratio of silica to metal oxide of 3.46:1.

This solution was further adjusted for the preparation of television tubes by dilution with water to a concentration of 70 grams of $SiO_2$ per liter and an electrolyte solution and phosphors were added. For comparison a potassium silicate solution with a mole ratio of $SiO_2:K_2O$ of 4.18:1 was at first diluted to a silica content of 19.48% and the mole ratio simultaneously adjusted by the addition of 50% potassium hydroxide solution to 3.43:1. This solution was filtered and the concentration adjusted to 70 grams $SiO_2$ per liter by further dilution. Then the electrolyte solution and phosphor were added.

A television screen is usually prepared by adding a solution of alkali metal silicate, preferably potassium silicate, and an electrolyte solution, especially in the form of a barium nitrate solution to an aqueous suspension of the phosphor. A precipitate of silica and barium containing particles which forms settles together with the phosphor to the bottom of the vertical tube. It is thought that crosslinking of the silicic acid causes adhesion of the particles to each other and to the surface of the glass. The supernatant liquid is poured off as soon as possible (about 15–20 minutes). The phosphor layer on the bottom of the glass has to withstand this process; that is, it must have sufficient wet strength.

It has been found that the wet strength of the preferred soluion, described in the first paragraph of this example, is about 50% better than the later-described comparison solution.

*Example 16*

A potassium silicate solution with a mole ratio of $SiO_2:K_2O$ of 3.43:1 and a silica content of 19.17% was diluted with water to 74 grams of $SiO_2$ per liter and heated at 150° C. for 1.5 hours in a closed reaction vessel. After filtration, an alkali metal silicate solution with a mole ratio of $SiO_2:K_2O$ of 3.37:1 and a concentration of 71.4 grams of $SiO_2$ per liter was obtained. This solution can be used without further dilution for the preparation of television screens. It produces screens with good wet strength corresponding to the potassium silicate solution described in paragraph one of Eaxmple 15.

*Example 17*

A potassium silicate solution with a mole ratio of $SiO_2:K_2O$ of 3.48:1 and a silica content of 19.2% was diluted with water to a concentration of 68.8 grams of $SiO_2$ per liter and heated at 145° C. for 1.5 hours in an autoclave. The precipitate was filtered off and the alkali silicate solution evaporated in vacuum to a commercial concentration of 19.3% silica. The mole ratio of the solution was 3.39:1.

If this solution is to be used for the production of television screens, it is diluted with water to a concentration of 70 grams of $SiO_2$ per liter and electrolyte solution and phosphor are added.

This solution gives a 50% better wet strength than a control solution prepared by dilution of a potassium silicate solution of the same mole ratio (3.48:1) to a concentration of 70 grams of $SiO_2$ per liter.

*Example 18*

A potassium silicate solution with a mole ratio of $SiO_2:K_2O$ of 4.17:1 and a silica content of 8.1% was heated in a rotating autoclave for 1.5 hours by direct introduction of super-heated steam at 4 atmospheres. The precipitated silca was filtered off. The mole ratio of the potassium silicate solution was decreased from 3.76:1 by the addition of 50% potassium hydroxide solution to 3.45:1. This solution was evaporated in vacuum to a commercial concentration of 19.47%. Good wet strength was obtained with this solution when it was diluted to about 75 grams of $SiO_2$ per liter.

*Example 19*

A potassium silicate solution with a mole ratio of $SiO_2:K_2O$ of 4.16:1 and a silica content of 21.6% was diluted with water to a cencentration of 164 grams of $SiO_2$ per liter and heated in a pressure container to 145° C. for 1.5 hours. The precipitated silica gel was filtered off and the mole ratio of the potassium silicate solution of 4.1 reduced by the addition of potassium hydroxide solution to 3.5:1 at the same time decreasing the concentration to 70 grams of $SiO_2$ per liter. This solution was used directly for the preparation of television screens with good wet strength.

*Example 20*

An alkali metal silicate solution with a mole ratio of $SiO_2:Na_2O$ of 3.89:1 and a silica content of 20.2 grams per liter was continuously introduced into a tube under pressure while the tube was being heated from the outside. The inside temperature in the tube was 150° C. Retention time was about 10 minutes.

An adjustable valve was located at the end of the tube from which the suspension of silica in silicate solution continuously flowed and was collected under atmospheric pressure in an open vessel. The filtration was done in the usual way.

*Example 21*

A solution of potassium silicate diluted to 27.2 grams of $SiO_2$ per liter and having a mole ratio of $SiO_2:K_2O$ of 3.421:1 was placed in a pressure-tight silver flask and held in an oven, preheated to 170° C., for 1.5 hours. At the end of this period the solution was cooled and the precipitated silica was filtered off. A yield of 14.3% of the original silica present was obtained.

The finely divided silica removed from the solutions of Examples 20 and 21 was not birefringent and was, therefore, either amorphous or isometric.

*Example 22*

A solution of potassium silicate having a mole ratio of $SiO_2:K_2O$ of 3.93:1 at a concentration of 80.2 grams of silica per liter was placed in a pressure-tight silver flask and rotated in an oil bath for 1.5 hours at 145° C. Subsequently the solution was reduced to a mole ratio of $SiO_2:K_2O$ to 3.71:1 and was further adjusted to a mole ratio of 3.30:1 by the addition of KOH. This solution was filtered through a fine pore filter to remove the precipitate which was amporphous and provided a yield of about 4% of the original $SiO_2$. The residual solution was used in standard screen tests described below in which the phosphor was suspended in the solution containing 6000 p.p.m. $SiO_2$ and the concentration of barium acetate was varied as shown in the following table:

| Barium Acetate, p.p.m. | Wet Strength, mm. | Rewet Strength, mm. |
|---|---|---|
| 300 | 2.0 | 0.75 |
| 400 | 0.75 | 1.00 |
| 500 | 0.75 | 1.5 |

The same silicate solution when adjusted to a mole ratio of 3.30:1 without the heat treatment of this invention gave wet strength at 400 p.p.m. of barium acetate as measured by the hole diameter of 2.25 and at 500 p.p.m. of 3 mm.

Furthermore, the silicate solution of this invention stood for two or three days between the time of preparation and the screen testing. Ordinarily, diluted potassium silicate solutions lose their effectiveness when standing for such a time and fresh solutions of potassium silicate are made up each day.

The method of preparing and testing the screen in Example 22 was that generally used in the United States. The inner bottoms (approximately 50 square centimeters) of 400 ml. Pyrex glass beakers were cleaned with 5% $NH_4HF_2$ solution, rinsed, and used as the base for the preparation of the screens with a volume of settling solution of 250 ml. The screens were prepared by first placing in the beaker a cushion of dilute barium acetate formed with 200 ml. of water plus the volume of 1% stock barium acetate required to give the necessary dosage in the final cushion. The necessary volume of potassium silicate solution was made up to 250 ml. with distilled water. Then 0.20 gram of phosphor, sufficient for 4 milligrams per cm.² of bottom surface was added to the dilute silicate solution and stirred rapidly for 20 seconds with a glass rod, and then this suspension was poured into the cushion of barium acetate solution already in the 400 ml. beaker and dispersed uniformly by a few simple back-and-forth shakes of the beaker. After this the phosphor was allowed to settle quietly. Settling was allowed to continue for 30 minutes and the wet screen strength was then measured. The settling solution was next carefully poured off and the breakers drained at 45 degrees for about 2 minutes. They were then placed upside-down in an oven and dried at 60° C. for 0.5 hour and tested for rewet strength.

For testing wet strength, a reservoir of tap water at 25–26° C. was placed exactly 1 meter above the screens. The orifice was a 1 ml. volumetric pipette with the tip ground until the opening was about 0.5 mm. in diameter and clamped vertically exactly 1.0 cm. above the screen. Water was then allowed to flow through the orifice at a rate of 8.5 ml. in 10 seconds and impinge on the screen for 5 seconds after which the screen was rotated to a fresh portion for duplicate tests.

For the rewet test, the screens after drying were again wetted and clamped upside-down so that the water at 25 p.s.i.g. would hit about the middle of the heretofore untested area. The protecting deflector was swung away for 5 minutes allowing the spot to form and then the deflector was returned, the beaker rotated about 20° of arc, and a duplicate spot made.

The wet screen spots may be measured by a millimeter scale when the diameter is large and with a template having varying holes varying by 0.5 mm. The rewet spots are measured by means of calipers with the beaker held upside-down above a dark background.

More or less detailed claims will be presented hereinafter, and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine non-inventive experimentation. Certainly no invention would be involved in substitutig one or more of such obvious equivalents for the material specifically recited in the claims. It is intended that all such obvious equivalent be encompassed within the scope of this invention and patent grant in accordance with the well-known doctrine of equivalents as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. A process for the preparation of a finely divided amorphous silica and a pure alkali metal silicate solution which comprises the steps of:
    (a) preparing an aqueous alkali metal silicate solution having a mole ratio of silica to metal oxide within the range of about 2.5:1 to about 4.5:1 and a maximum concentration below about 165 grams of silica per liter of said solution, said mol ratio and said concentration being correlated so that operations are always conducted in the region of unstability;
    (b) heating said solution under pressure to a temperature of at least about 100° C. for a time between about 10 minutes and about 3 hours and sufficient to cause precipitation of amorphous silica from said solution; and
    (c) separating said amorphous silica from said solution.

2. A process according to claim 1 wherein the mole ratio of silica to metal oxide is within the range of about 3.0:1 to about 4.2:1.

3. A process according to claim 1 wherein the concentration of silica is within the range of about 10 grams to about 125 grams of silica per liter of said solution.

4. A process according to claim 1 wherein said silicate is potassium silicate.

5. A process according to claim 1 wherein said silicate is sodium silicate.

6. A process for the preparation of a finely divided silica and a pure alkali metal silicate solution which comprises the steps of:
    (a) preparing an aqueous alkali metal silicate solution having a mole ratio of silica to metal oxide of about 3.0:1 to about 4.2:1 and a concentration of about 10 grams to about 125 grams of silica per liter of said solution; said mole ratio and said concentration being correlated so that operations are always conducted in the region of instability;
    (b) heating said solution under pressure to a temperature of at least 100° C. for a time between about 10 minutes and about 3 hours and sufficient to cause precipitation of said silica from said solution; and
    (c) separating said silica from said solution.

7. A process according to claim 6 wherein said solution is heated to a temperature of about 130° C. to about 200° C.

8. A process according to claim 6 wherein said silicate is potassium silicate.

9. A process according to claim 6 wherein said silicate is sodium silicate.

10. A process for the preparation of a finely divided silica and a pure alkali metal silicate solution which comprises the steps of:
    (a) preparing an aqueous alkali metal silicate solution having a mole ratio of silica to metal oxide of about 2.5:1 to about 4.5:1 and a maximum concentration below about 165 grams of silica per liter of said solution; said mol ratio and said concentration being correlated so that operations are always conducted in the region of instability;

(b) heating said solution under pressure to a temperature of at least about 100° C. for a time between about 10 minutes and about 3 hours and sufficient to cause precipitation of silica from said solution;

(c) separating said silica from said solution;

(d) adjusting the solution obtained by step (c) to obtain a solution having a mole ratio of silica to metal oxide of about 2.5:1 to about 4.5:1 and a maximum concentration below about 165 grams of silica per liter of said solution;

(e) heating said solution under pressure to a temperature of at least about 100° C. for a time sufficient to cause precipitation of silica from said solution; and (f) separating said silica from said solution.

11. A process according to claim 10 wherein the solution obtained by step (c) is adjusted by the addition of alkali metal silicate.

12. A process according to claim 10 wherein the solution obtained by step (c) is adjusted by the addition of water.

13. A process according to claim 10 wherein the solution obtained by step (c) is adjusted by the addition of an alkali metal hydroxide.

14. A continuous process for the preparation of finely divided silica and a pure alkali metal silicate solution which comprises the steps of:

(a) continuously introducing an alkali metal silicate solution having a mole ratio of silica to metal oxide of about 2.5:1 to about 4.5:1 and a maximum concentration below about 165 grams of silica per liter of said solution into a reactor vessel; said mol ratio and said concentration being correlated so that operations are always conducted in the region of instability;

(b) heating said solution under pressure to a temperature of at least 100° C. while retaining said solution in said vessel for a time between about 10 minutes and about 3 hours and sufficient to cause precipitation of silica from said solution;

(c) continuously removing the thus formed suspension; and (d) separating said silica from said suspension.

15. A process for the preparation of a finely divided silica and a pure alkali metal silicate solution which comprises the steps of:

(a) preparing an aqueous alkali metal silicate solution having a mole ratio of silica to metal oxide within the range of about 2.5:1 to about 4.5:1 and a maximum concentration below about 165 grams of silica per liter of said solution, said mol ratio and said concentration being correlated so that operations are always conducted in the region of instability, said concentration of silica increasing substantially proportionately to an increase in said mole ratio of silica to metal oxide;

(b) heating said solution under pressure for between about 10 minutes and 3 hours to a temperature of at least about 100° C.; and (c) separating said silica from said solution.

16. A process according to claim 15 wherein said concentration of silica is within the range of about 10 grams to about 125 grams of silica per liter of solution.

17. A process according to claim 16 wherein the mole ratio of silica to alkali metal oxide is about 3.0:1 to about 4.2:1.

18. A process according to claim 17 wherein solution is heated to a temperature of about 130° C. to about 200° C. for about 10 minutes to about 3 hours.

19. A process according to claim 18 wherein said silicate is potassium silicate.

20. A process according to claim 18 wherein said silicate is sodium silicate.

References Cited

UNITED STATES PATENTS

| | | | |
|---|---|---|---|
| 2,585,609 | 2/1952 | Wills | 23—110 |
| 3,085,861 | 4/1963 | Thornhill et al. | 23—182 |

OSCAR R. VERTIZ, *Primary Examiner.*

A. J. GREIF, *Assistant Examiner.*